US011484818B2

(12) United States Patent
De Los Reyes, III et al.

(10) Patent No.: US 11,484,818 B2
(45) Date of Patent: Nov. 1, 2022

(54) SELF-CLEANING SCREEN

(71) Applicant: NORTH CAROLINA STATE UNIVERSITY, Raleigh, NC (US)

(72) Inventors: Francis L. De Los Reyes, III, Raleigh, NC (US); Tate W. Rogers, Raleigh, NC (US); Walter Beckwith, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 17/430,165

(22) PCT Filed: Feb. 10, 2020

(86) PCT No.: PCT/US2020/017418
§ 371 (c)(1),
(2) Date: Aug. 11, 2021

(87) PCT Pub. No.: WO2020/167623
PCT Pub. Date: Aug. 20, 2020

(65) Prior Publication Data
US 2021/0362078 A1 Nov. 25, 2021

Related U.S. Application Data

(60) Provisional application No. 62/803,885, filed on Feb. 11, 2019.

(51) Int. Cl.
*B01D 29/11* (2006.01)
*B01D 29/33* (2006.01)
(Continued)

(52) U.S. Cl.
CPC ............ *B01D 29/114* (2013.01); *B01D 29/33* (2013.01); *B01D 29/6476* (2013.01); *B01D 35/0276* (2013.01)

(58) Field of Classification Search
None
See application file for complete search history.

(56) References Cited

U.S. PATENT DOCUMENTS 337,423 A * 3/1886 Moore ............... B01D 24/4631
210/796
785,125 A * 3/1905 Shafer .................. B01D 21/245
210/241
(Continued)

FOREIGN PATENT DOCUMENTS

GB 829975 A * 3/1960 ......... B01D 29/6476
GB 2131098 A * 6/1984 ................ F04F 3/00
(Continued)

OTHER PUBLICATIONS

International Search Report and Written Opinion issued in PCT/US2020/017418, dated May 4, 2020, 11 pages.

*Primary Examiner* — Robert J Popovics
(74) *Attorney, Agent, or Firm* — Meunier Carlin & Curfman LLC

(57) ABSTRACT

Various implementations include a self-cleaning screen device including a screen and auger. The screen is a hollow cylinder and has a screen central axis, a screen inner surface, a screen outer surface opposite and radially spaced apart from the screen inner surface, a screen first end, and a screen second end opposite and axially spaced apart from the screen first end. The screen outer surface defines a plurality of openings extending radially to the screen inner surface. The auger is helically shaped and has an auger central axis, an auger first end, and an auger second end opposite and axially spaced apart from the auger first end. The auger is disposed around at least a portion of the screen outer surface such that the auger central axis and the screen central axis (Continued)

are coincident with each other. The auger is rotatable about the auger central axis relative to the screen.

16 Claims, 6 Drawing Sheets

(51) Int. Cl.
    *B01D 29/64*      (2006.01)
    *B01D 35/027*      (2006.01)

(56) References Cited

U.S. PATENT DOCUMENTS

| | | | | |
|---|---|---|---|---|
| 810,020 A * | 1/1906 | Applegate | B01D 33/06 | 210/396 |
| 1,033,745 A * | 7/1912 | Smith | B01D 29/114 | 210/107 |
| 1,210,759 A * | 1/1917 | Breddin | E02B 1/006 | 210/156 |
| 1,510,863 A * | 10/1924 | Rose | B01D 29/25 | 210/413 |
| 1,639,590 A * | 8/1927 | Corkran | B01D 29/05 | 210/414 |
| 2,010,538 A * | 8/1935 | Evans | E03F 7/10 | 210/153 |
| 2,087,708 A * | 7/1937 | Trinkle | B01D 29/6476 | 210/415 |
| 2,125,532 A * | 8/1938 | Wells | B01D 29/94 | 210/414 |
| 2,136,853 A * | 11/1938 | Knecht | B01D 29/44 | 210/397 |
| RE21,639 E * | 11/1940 | Trinkle | B01D 29/114 | 210/415 |
| 2,354,150 A * | 7/1944 | Skinner | B01D 29/52 | 210/330 |
| 2,408,741 A * | 10/1946 | Dodge | B01D 29/6476 | 210/355 |
| 2,439,463 A * | 4/1948 | Gebauer | B01D 29/48 | 210/179 |
| 2,596,151 A * | 5/1952 | Hudson | E03F 7/10 | 134/168 R |
| 2,713,921 A * | 7/1955 | Turner | B01D 46/24 | 55/296 |
| 2,768,949 A * | 10/1956 | Hewey | E03F 1/002 | 210/747.1 |
| 3,262,571 A * | 7/1966 | Petretti | E03F 7/10 | 210/297 |
| 3,329,409 A * | 7/1967 | Raleigh | B01F 7/00416 | 366/146 |
| 3,574,098 A * | 4/1971 | Boorujy | C02F 1/286 | 210/668 |
| 3,593,853 A * | 7/1971 | Koethke | B01D 35/16 | 210/320 |
| 3,677,413 A * | 7/1972 | Boorujy | C02F 1/286 | 502/404 |
| 3,739,915 A * | 6/1973 | Kehoe | B01D 29/118 | 210/399 |
| 3,762,563 A * | 10/1973 | Petersen | B01D 29/118 | 210/415 |
| 3,924,625 A * | 12/1975 | Peterson | A61D 1/12 | 604/131 |
| 3,928,188 A * | 12/1975 | Link | B01D 29/117 | 209/250 |
| 3,959,140 A * | 5/1976 | Legras | B01D 29/25 | 210/107 |
| 3,990,631 A * | 11/1976 | Schall | B04B 3/04 | 494/85 |
| 3,997,441 A * | 12/1976 | Pamplin, Jr. | B01D 29/25 | 210/777 |
| 4,002,559 A * | 1/1977 | Paterson | B07B 11/06 | 100/106 |
| 4,085,050 A * | 4/1978 | Gervasi | B01D 29/25 | 210/332 |
| 4,160,732 A * | 7/1979 | Maffet | B01D 29/25 | 210/780 |
| 4,175,872 A * | 11/1979 | Primus | B01F 5/0206 | 366/139 |
| 4,178,209 A * | 12/1979 | Tolbert | B01D 29/11 | 435/297.2 |
| 4,193,206 A * | 3/1980 | Maffet | C02F 11/13 | 210/769 |
| 4,193,865 A * | 3/1980 | Aario | B07B 1/20 | 209/240 |
| 4,202,773 A * | 5/1980 | Fink | B30B 9/166 | 210/403 |
| 4,204,964 A * | 5/1980 | Cailliot | B04B 3/08 | 210/373 |
| 4,214,377 A * | 7/1980 | Maffet | F26B 5/14 | 210/767 |
| 4,214,878 A * | 7/1980 | Weiss | B01D 46/88 | 55/296 |
| 4,237,618 A * | 12/1980 | Maffet | B30B 9/12 | 100/117 |
| 4,329,069 A * | 5/1982 | Graham | B01F 5/12 | 366/270 |
| 4,439,320 A * | 3/1984 | Blok | B01F 29/40113 | 210/411 |
| 4,441,824 A * | 4/1984 | Brokaw | A01C 3/026 | 366/266 |
| 4,464,253 A * | 8/1984 | Kuri | B01D 29/60 | 210/414 |
| 4,490,252 A * | 12/1984 | Brigante | C02F 1/485 | 210/222 |
| 4,552,655 A * | 11/1985 | Granot | B01D 29/114 | 210/108 |
| 4,585,551 A * | 4/1986 | Musselmann | D21B 5/026 | 210/415 |
| 4,594,006 A * | 6/1986 | Depeault | B01F 5/0206 | 366/190 |
| 4,624,786 A * | 11/1986 | Schlegel | B30B 9/26 | 210/414 |
| 4,634,524 A * | 1/1987 | Huber | B01D 33/648 | 210/158 |
| 4,661,046 A * | 4/1987 | Ruyle | A01C 3/026 | 406/116 |
| 4,685,868 A * | 8/1987 | Bodensteiner | F04F 1/00 | 366/270 |
| 4,830,585 A * | 5/1989 | Ruyle | A01C 3/026 | 415/66 |
| 4,971,526 A * | 11/1990 | Ruyle | F04B 19/12 | 415/72 |
| 4,983,290 A * | 1/1991 | Schumann | B01D 29/94 | 55/296 |
| 4,994,332 A * | 2/1991 | Coin | B01D 36/00 | 429/405 |
| 5,082,013 A * | 1/1992 | Scheib | A62C 35/20 | 137/1 |
| 5,085,771 A * | 2/1992 | Huang | B01D 29/071 | 210/332 |
| 5,156,735 A * | 10/1992 | Pecci | B01D 29/6476 | 210/488 |
| 5,186,834 A * | 2/1993 | Arai | B01D 29/6476 | 210/413 |
| 5,364,233 A * | 11/1994 | Benoit | F04D 29/2211 | 417/231 |
| 5,632,907 A * | 5/1997 | Norbury | B01D 29/23 | 210/787 |
| 5,851,087 A * | 12/1998 | Berry, III | B01D 29/15 | 405/127 |
| 5,922,197 A * | 7/1999 | Sparks | E03F 9/00 | 210/232 |
| 5,938,939 A * | 8/1999 | Vial | B01J 19/0046 | 210/767 |
| 6,089,790 A * | 7/2000 | Berry, III | E03B 3/04 | 405/127 |
| 6,096,228 A * | 8/2000 | Angelle | B01D 21/0096 | 210/803 |

(56) References Cited

U.S. PATENT DOCUMENTS

| | | | | |
|---|---|---|---|---|
| 6,790,368 | B1 * | 9/2004 | Vachon | E03F 7/10 |
| | | | | 15/340.1 |
| 7,073,433 | B2 * | 7/2006 | Burke | C10F 5/04 |
| | | | | 100/126 |
| 7,214,314 | B2 * | 5/2007 | Reyniers | A01K 63/045 |
| | | | | 15/1.7 |
| 7,378,026 | B1 * | 5/2008 | Thompson | E04H 4/1636 |
| | | | | 210/167.16 |
| 7,419,520 | B2 * | 9/2008 | Lee | A47L 9/20 |
| | | | | 15/352 |
| 7,445,123 | B1 * | 11/2008 | Chiou | B01D 29/6476 |
| | | | | 210/415 |
| 7,501,058 | B1 * | 3/2009 | Lawrence, Sr. | B01D 29/33 |
| | | | | 210/232 |
| 8,025,156 | B2 * | 9/2011 | Tapp | B01D 29/94 |
| | | | | 210/402 |
| 8,192,624 | B2 * | 6/2012 | Takao | B01D 33/727 |
| | | | | 210/324 |
| 8,388,836 | B1 * | 3/2013 | Fetterman, III | B01D 35/26 |
| | | | | 210/414 |
| 8,511,476 | B2 * | 8/2013 | Cassani | B03B 5/32 |
| | | | | 209/288 |
| 8,679,335 | B1 * | 3/2014 | Dufort | B01D 29/33 |
| | | | | 210/241 |
| 8,939,637 | B2 * | 1/2015 | Depault | F04B 23/04 |
| | | | | 366/270 |
| 8,944,758 | B2 * | 2/2015 | Nuhn | A01C 3/026 |
| | | | | 415/206 |
| 9,327,219 | B2 * | 5/2016 | Brunswick | B01D 29/114 |
| 9,409,106 | B2 * | 8/2016 | Levitt | B01D 29/606 |
| 9,451,844 | B2 * | 9/2016 | Olucha Soler | A47J 19/02 |
| 9,488,190 | B2 * | 11/2016 | Nuhn | F04D 13/02 |
| 9,895,635 | B2 * | 2/2018 | Levitt | B01D 29/23 |
| 10,040,013 | B2 * | 8/2018 | Kawano | B01D 29/62 |
| 10,066,629 | B2 * | 9/2018 | Nuhn | F04D 29/4293 |
| 10,130,901 | B2 * | 11/2018 | de los Reyes, III | B65G 33/16 |
| 10,212,879 | B2 * | 2/2019 | Nuhn | B01F 15/026 |
| 10,286,338 | B2 * | 5/2019 | Levitt | B01D 29/902 |
| 10,286,339 | B2 * | 5/2019 | Crandall | B01D 35/02 |
| 10,583,443 | B2 * | 3/2020 | Bauer | B04B 1/20 |
| 10,646,801 | B2 * | 5/2020 | Tameroglu | B01D 29/35 |
| 10,751,648 | B1 * | 8/2020 | Renfrow | B01D 29/54 |
| 10,968,617 | B2 * | 4/2021 | Duperon | B01D 21/2461 |
| 11,207,617 | B2 * | 12/2021 | Arai | B01D 29/6476 |
| 2013/0153471 | A1 * | 6/2013 | Cassani | B04B 1/20 |
| | | | | 209/162 |
| 2015/0165354 | A1 | 6/2015 | Brunswick | |
| 2015/0203393 | A1 * | 7/2015 | Dendel | C02F 11/121 |
| | | | | 210/741 |
| 2015/0298139 | A1 * | 10/2015 | Wilkes | B03C 1/288 |
| | | | | 96/2 |
| 2016/0214039 | A1 * | 7/2016 | Tameroglu | B01D 29/6446 |
| 2016/0310877 | A1 * | 10/2016 | Levitt | B01D 63/06 |
| 2017/0014736 | A1 * | 1/2017 | Osman Oguz | B01D 29/606 |
| 2017/0136391 | A1 * | 5/2017 | Crandall | E21B 27/005 |
| 2018/0154285 | A1 * | 6/2018 | de los Reyes, III | E03F 7/106 |
| 2020/0230530 | A1 * | 7/2020 | Levitt | B01D 11/0288 |
| 2020/0385974 | A1 * | 12/2020 | Duperon | B01D 29/445 |
| 2021/0060460 | A1 * | 3/2021 | Arai | A23L 5/20 |
| 2021/0362078 | A1 * | 11/2021 | De Los Reyes, III | |
| | | | | B01D 29/114 |
| 2022/0016552 | A1 * | 1/2022 | Mania | B01D 29/70 |

FOREIGN PATENT DOCUMENTS

| | | | | |
|---|---|---|---|---|
| GB | 2337948 | A | 12/1999 | |
| GB | 2558948 | A * | 7/2018 | E04H 1/1205 |
| JP | H08243319 | A | 9/1996 | |
| WO | 94/08088 | A1 | 4/1994 | |
| WO | WO-2013189549 | A1 * | 12/2013 | B03C 1/286 |
| WO | WO-2020167623 | A1 * | 8/2020 | B01D 29/6476 |

* cited by examiner

SELF-CLEANING SCREEN

CROSS-REFERENCE TO RELATED APPLICATIONS

This application is a national stage application filed under 35 U.S.C. § 371 of PCT/US2020/017418 filed Feb. 10, 2020, which claims the benefit of U.S. Application No. 62/803,885 filed Feb. 11, 2019, the contents of which are incorporated herein by reference in their entirety.

BACKGROUND

Pit latrines are typically holes formed in the ground for the intended use of collecting human urine and feces. Pit latrines are often used in developing countries where waste management is unavailable. As a pit latrine fills, the pit latrine must be emptied.

Some methods for emptying pit latrines include suctioning the contents of the pit latrine. However, larger items such as garbage, rocks, and plant matter sometimes accumulate in pit latrines. These larger items can clog or bind the driving mechanisms in many of the current suction devices. Thus, there is a need for a device that can exclude larger items from a suction device for emptying pit latrines.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Various implementations include a self-cleaning screen device. The self-cleaning screen device includes a screen and an auger. The screen is a hollow cylinder and has a screen central axis, a screen inner surface, a screen outer surface opposite and radially spaced apart from the screen inner surface, a screen first end, and a screen second end opposite and axially spaced apart from the screen first end. The screen outer surface defines a plurality of openings extending radially to the screen inner surface. The auger is helically shaped and has an auger central axis, an auger first end, and an auger second end opposite and axially spaced apart from the auger first end. The auger is disposed around at least a portion of the screen outer surface such that the auger central axis and the screen central axis are coincident with each other. The auger is rotatable about the auger central axis relative to the screen.

Various other implementations include a suction system. The suction system includes a pump, a pipe, and a self-cleaning screen device. The pump has a suction inlet. The pipe has a pipe central axis, a pipe inner surface, a pipe outer surface opposite and radially spaced apart from the pipe inner surface, a pipe first end, and a pipe second end opposite and axially spaced apart from the pipe first end. The self-cleaning screen device includes a screen and an auger. The screen is a hollow cylinder and has a screen central axis, a screen inner surface, a screen outer surface opposite and radially spaced apart from the screen inner surface, a screen first end, and a screen second end opposite and axially spaced apart from the screen first end. The screen outer surface defines a plurality of openings extending radially to the screen inner surface. The auger is helically shaped and has an auger central axis, an auger first end, and an auger second end opposite and axially spaced apart from the auger first end. The auger is disposed around at least a portion of the screen outer surface such that the auger central axis and the screen central axis are coincident with each other. The auger is rotatable about the auger central axis relative to the screen. The screen first end is coupled to the pipe second end such that the pipe central axis and the screen central axis are coincident with each other.

Figure 1:
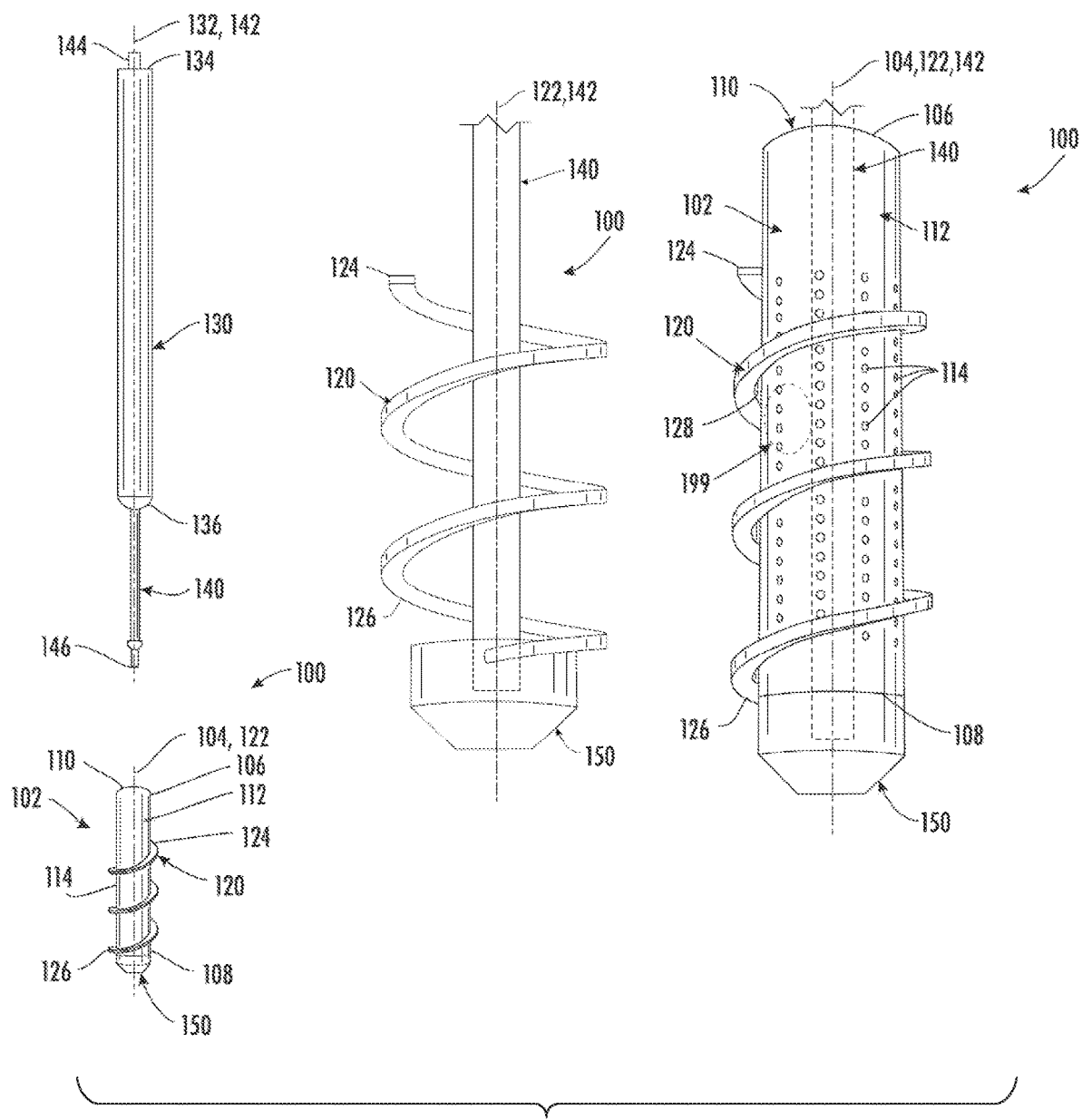
FIG. 1 is a side view of a self-cleaning screen device, according to one implementation.

FIG. 1 shows a self-cleaning screen device 100. The self-cleaning screen device 100 includes a screen 102, an auger 120, a pipe 130, a shaft 140, and an auger mounting disk 150. The self-cleaning screen device 100 is designed to suction or otherwise cause the flow of the fluid within a pit latrine through the plurality of openings 114 defined by the screen outer surface 112 while excluding relatively larger items 199 such as garbage, rocks, plant matter, or any other item too large to fit through the plurality of openings 114 (referred to as "larger items" herein). Rotation of the helically shaped auger 120 around the screen 102 sweeps these larger items 199 away from the screen 102 to prevent the openings in the screen 102 from being clogged. Although the self-cleaning screen device 100 described herein is intended to be used to remove human feces from pit latrines, the self-cleaning screen device 100 can also be used to remove any fluid from a fluid body while excluding large items 199 of any kind.

The screen 102 is a hollow cylindrical tube extending circumferentially around a screen central axis 104. The screen 102 has a screen first end 106 and a screen second end 108 opposite and axially spaced apart from the screen first end 106. The screen 102 also has a screen inner surface 110 and a screen outer surface 112 opposite and radially spaced apart from the screen inner surface 110. The screen inner surface 110 and the screen outer surface 112 both extend axially from the screen first end 106 to the screen second end 108. A portion of the screen outer surface 112 defines a plurality of openings 114 extending radially to the screen inner surface 110.

The auger 120 is helically shaped and has an auger central axis 122, an auger first end 124, and an auger second end 126 opposite and axially spaced apart from the auger first end 124. The auger 120 extends circumferentially around the auger central axis 122 as the auger 120 extends axially from the auger first end 124 to the auger second end 126. The auger 120 is disposed around the screen outer surface 112 such that the auger 120 extends axially along the entire portion of the screen 102 defining the plurality of openings 114. The auger central axis 122 and the screen central axis 104 are coincident with each other, and the auger 120 is rotatable about the auger central axis 122 relative to the screen 102.

The pipe 130 has a hollow cylindrical tube extending circumferentially around a pipe central axis 132. The pipe 130 has a pipe first end 134 and a pipe second end 136 opposite and axially spaced apart from the pipe first end 134. The screen first end 106 is coupled to the pipe second end 136 such that the pipe central axis 132 and the screen central axis 104 are coincident with each other.

The shaft 140 extends along a shaft central axis 142 and has a shaft first end 144, and a shaft second end 146 opposite and spaced apart from the shaft first end 144. The shaft 140 is disposed inside the pipe 130 and the screen 102 such that the shaft central axis 142 is coincident with the pipe central axis 132, the screen central axis 104, and the auger central axis 122.

The shaft second end 146 is coupled to the auger mounting disk 150, and the auger mounting disk 150 is coupled to the auger second end 126. Thus, the shaft second end 146 is fixedly coupled to the auger second end 126, via the auger mounting disk 150, such that the auger 120 does not rotate relative to the shaft 140. The auger mounting disk 150 transfers the rotational movement of the shaft 140 to the auger 120, causing the auger 120 to rotate relative to the screen 102. The auger 120 shown in FIG. 1 is configured to rotate between 300 RPM to 600 RPM. This range of auger 120 rotational speeds allows the auger 120 to sweep away any larger items 199 that have been suctioned to the screen 102. However, in other implementations, the rotational speed of the auger is higher than 600 RPM. Based on the suction pressure of the self-cleaning screen device 100, the size and weight of the larger items 199, and the viscosity of the fluid being suctioned, a rotational speed of the auger 120 can be selected such that the auger 120 can sweep or deflect any larger items 199 before the larger items 199 are able to reach the screen outer surface 112.

The auger 120 shown in FIG. 1 extends helically in a clockwise direction from the auger second end 126 to the auger first end 124 and the auger 120 rotates in a counter-clockwise direction as viewed axially from the auger second end 126. Because the auger 120 extends helically in a clockwise direction from the auger second end 126 to the auger first end 124, rotation of the auger 120 in the counterclockwise direction as viewed from the auger second end 126 causes larger items 199 that are suctioned to the screen 102 to be swept toward the screen first end 106 by the auger 120. Because the auger 120 sweeps the larger items 199 toward the screen first end 106, which would typically be oriented as the top-most portion of the screen 102 during use, the larger items 199 are swept upwardly, rather than downwardly where the larger items 199 could accumulate and be suctioned back toward the screen 102. Also, when larger items 199 accumulate along the screen 102 and create resistance to the rotation of the auger 120, the helically clockwise direction of the auger 120 and counterclockwise rotation of the auger 120, as viewed from the auger second end 126, causes the axial length of the auger 120 to shorten rather than elongate. This ensures that the auger 120 will not be axially elongated such that the auger 120 fails to resiliently return to its original axial length once the resistance is removed. However, in situations where it is desirable for the auger 120 to sweep the larger items 199 suctioned to the screen 102 toward the screen second end 108, the auger 120 shown in FIG. 1 can be rotated clockwise as viewed from the auger second end 126. In other implementations, the auger extends helically in a counterclockwise direction from the auger second end to the auger first end and the auger rotates in a clockwise direction as viewed axially from the auger second end. Because both the direction that the auger helically extends heliclly and the direction that the auger rotates are reversed from the implementation of the auger 120 shown in FIG. 1, the auger in this implementation also sweeps the larger items 199 suctioned to the screen toward the screen first end.

A gap 128 is defined between the auger 120 and the screen outer surface 112 of the self-cleaning screen device 100 shown in FIG. 1. The gap 128 is 4 mm as measured in the radial direction. However, in other implementations, the gap is between 1 mm and 10 mm Including a gap 128 between the auger 120 and screen outer surface 112 prevents or lessens the chances of the larger items 199 that are suctioned to the screen 102 from becoming lodged between the auger 120 and the screen outer surface 112, which creates excess friction and can cause the larger items 199 to become attached to the auger 120 as the auger 120 rotates. As the auger 120 shown in FIG. 1 rotates, the auger 120 causes the surrounding fluid to flow toward the screen first end 106. In many situations, the flow of the fluid caused by the auger 120 has enough force to sweep away the larger items 199 without the need for the auger 120 to contact the larger items 199.

Figure 2A:
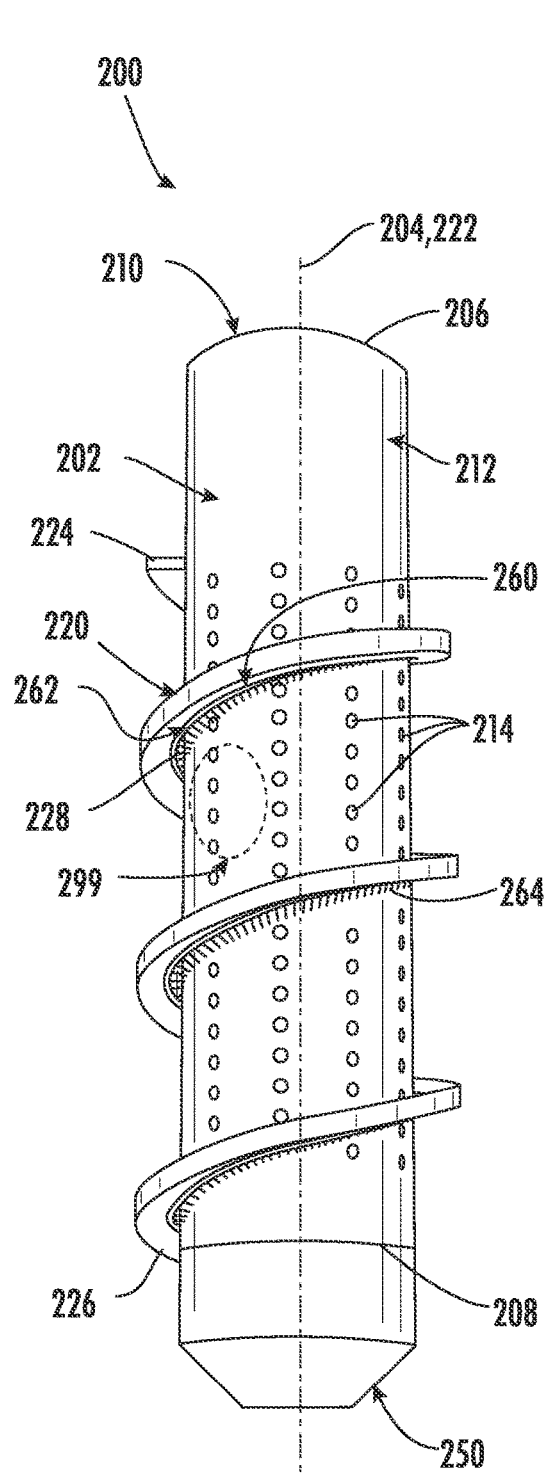
FIGS. 2A and 2B are side views of a self-cleaning screen device, according to other implementations.
Figure 2B:
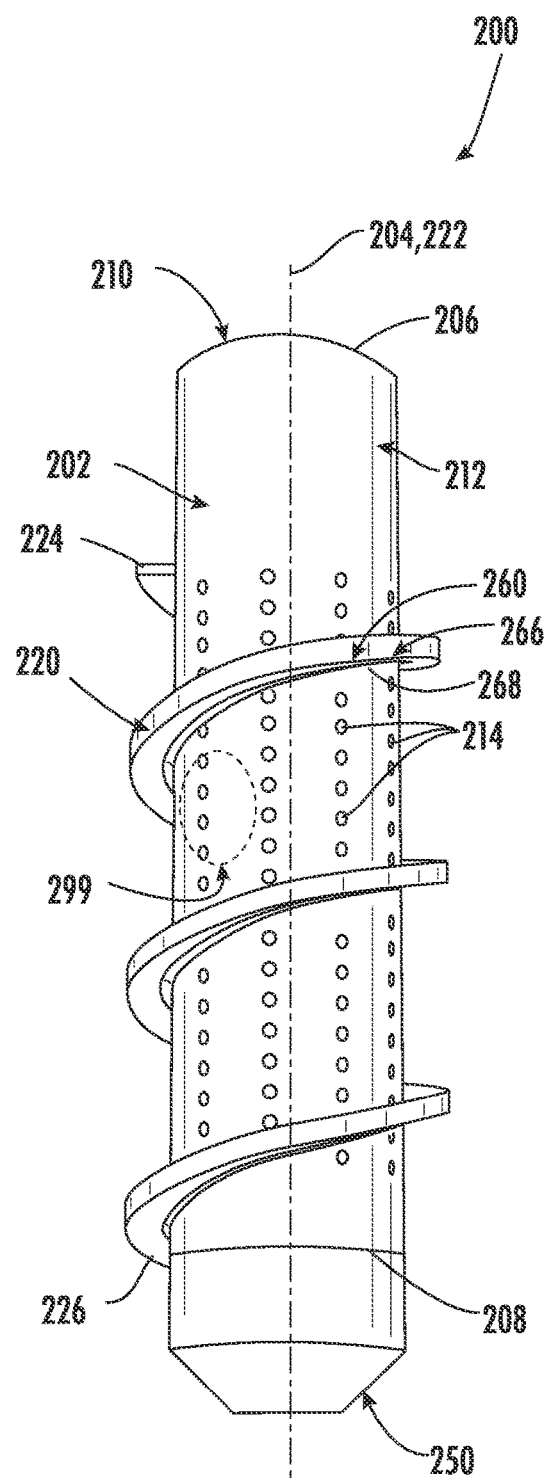

However, in some situations in which the larger items 299 that are suctioned to the screen 202 are not able to be swept away by the flow of fluid caused by the rotation of the auger 220, the auger 220 can include a sweeping extension 260 extending radially inwardly from the auger 220 toward the auger central axis 222. As shown in FIGS. 2A and 2B, the sweeping extension 260 extends across the gap 228 between the auger 220 and the screen outer surface 212. The sweeping extension 260 of the implementation of the self-cleaning screen device 200 shown in FIG. 2A includes a steel brush 262 having bristles 264 that extend from the auger 220 and across the gap 228 to contact the screen outer surface 212. The bristles 264 of the steel brush 262 are stiff enough to sweep away larger items 299, but bendable enough to allow the auger 220 to rotate without excess friction.

FIG. 2B shows another implementation of a self-cleaning screen device 200 including a sweeping extension 260. The sweeping extension 260 shown in FIG. 2B is a squeegee 266. The squeegee 266 includes a soft rubber blade 268 extending from the auger 220 and across the gap 228 to contact the screen outer surface 212. The rubber blade 268 is stiff enough to sweep away larger items 299 that are suctioned to the screen 202, but bendable enough to allow the auger 220 to rotate without excess friction.

Figure 3:
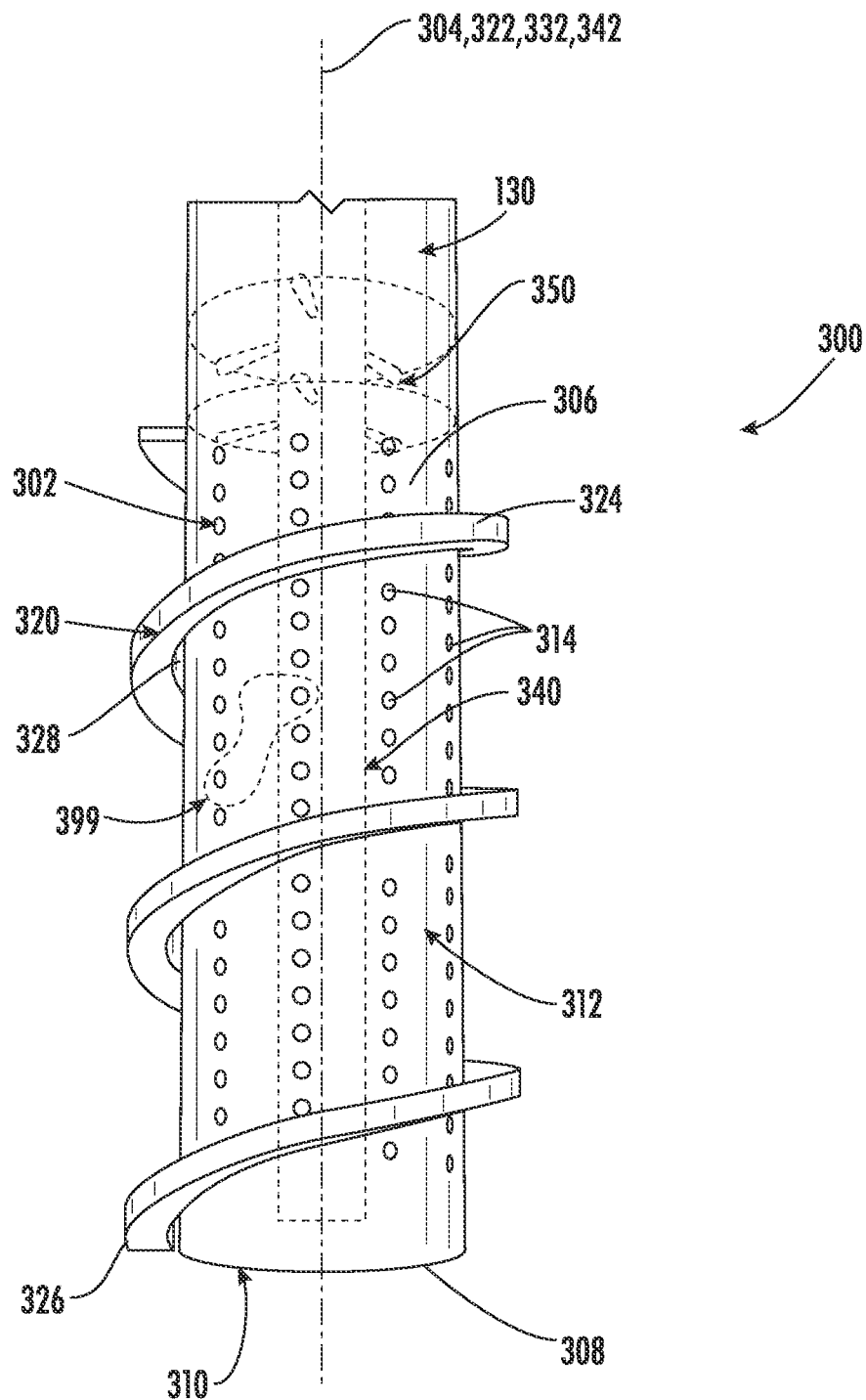
FIG. 3 is a side view of a self-cleaning screen device, according to another implementation.

FIG. 3 shows another implementation of a self-cleaning screen device 300 similar to the self-cleaning screen device 100 shown in FIG. 1. However, in FIG. 3, the auger mounting disk 350 is disposed between the screen first end 306 and the pipe second end 336. A portion of the shaft 340 is coupled to the auger mounting disk 350, and the auger mounting disk 350 is coupled to the auger first end 324. The auger 320 shown in FIG. 3 extends helically in a clockwise direction from the auger second end 326 to the auger first end 324 and the auger 320 rotates in a clockwise direction as viewed axially from the auger second end 326. Thus, the auger 320 sweeps any larger items 399 suctioned to the screen 302 toward the screen second end 308, which would be downwardly during typical use. As discussed above, this ensures that the auger 320 will not be axially elongated such that the auger 320 does not resiliently return to its original axial length once the resistance is removed. However, in other implementations, the auger extends helically in a counterclockwise direction from the auger second end to the auger first end and the auger rotates in a counterclockwise direction as viewed axially from the auger second end such that the auger sweeps any larger items 399 suctioned to the screen toward the screen first end. In some implementations, the portion of the shaft coupled to the auger mounting disk is the shaft second end.

In some implementations, the self-cleaning screen device includes two auger mounting disks. A first auger mounting disk is disposed at the screen first end, as shown in FIG. 3, and a second auger mounting disk is disposed at the screen second end, as shown in FIG. 1. The shaft extends to the second auger mounting disk such that the shaft second end is coupled to the second auger mounting disk and a portion of the shaft is coupled to the first auger mounting disk. As shown in FIGS. 1 and 3, the auger second end is coupled to the second auger mounting disk and the auger first end is coupled to the first auger mounting disk. Because the auger is coupled to an auger mounting disk at both of the auger first end and auger second end, the auger is prevented from axially shortening or elongating during use, as discussed above.

Figure 4:
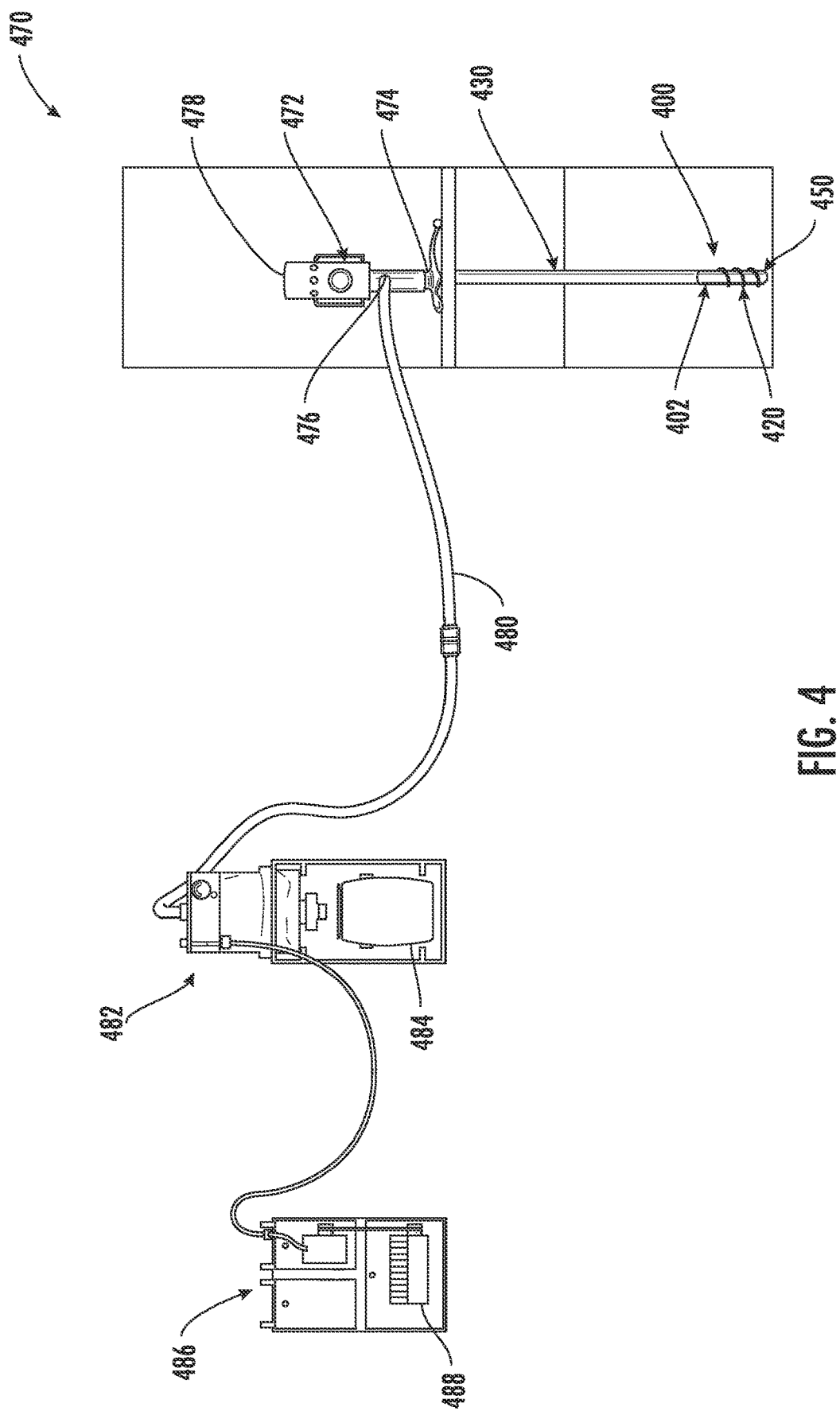
FIG. 4 is a side view of a suction system, according to another implementation.

FIG. 4 shows a suction system 470 including a self-cleaning screen device 400 similar to the self-cleaning screen device 100 shown in FIG. 1. The suction system 470 also includes an excluder 472, a vacuum tank, a vacuum pump 482, and an engine 488. The excluder 472 includes an inlet port 474 for coupling the pipe first end 434 to the excluder 472 and an outlet port 476 in fluid communication with the inlet port 474. The pipe 430 extends between the self-cleaning screen device 400 and the excluder 472. The excluder 472 includes a motor 478 coupled to the shaft 440 for rotating the auger 420. A hose 480 extends from the outlet port 476 of the excluder 472 to the vacuum tank 482. The vacuum tank 482 includes a removable storage barrel 484, and the fluid flowing from the self-cleaning screen device 400 to the vacuum tank 482 flows into the storage barrel 484. The engine 488 drives the vacuum pump 486, which creates the suction force within the suction system 470. In other implementations, the suction system includes a vacuum truck having a tank, rather than a vacuum tank, and the fluid flows directly into the tank of the vacuum truck.

Figure 5:
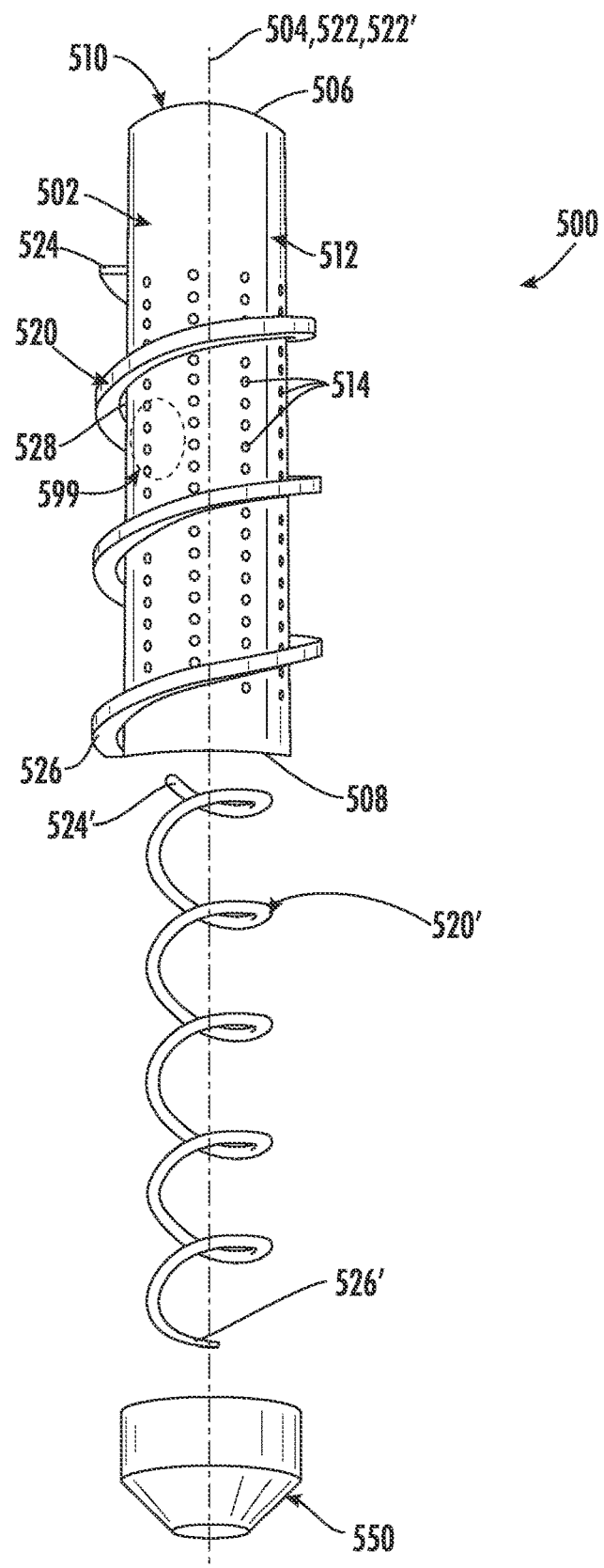
FIG. 5 is a side view of a self-cleaning screen device, according to another implementation.

FIG. 5 shows a self-cleaning screen device 500 similar to the self-cleaning screen device 100 shown in FIG. 1, but the self-cleaning screen device 500 shown in FIG. 5 includes a second, inner auger 520'. The inner auger 520' is helically shaped and has an inner auger central axis 522', an inner auger first end 524', and an inner auger second end 526' opposite and axially spaced apart from the inner auger first end 524'. The inner auger 520' extends circumferentially around the inner auger central axis 522' as the inner auger 520' extends axially from the inner auger first end 524' to the inner auger second end 526'. The inner auger 520' is disposed inside the screen 502 adjacent the screen inner surface 510 such that the inner auger 520' extends axially along the entire portion of the screen 502 defining the plurality of openings 514. The inner auger central axis 522', the auger central axis 522, and the screen central axis 504 are coincident with each other, and the inner auger 520' is rotatable about the inner auger central axis 522' relative to the screen 502. Both the auger second end 526 and the inner auger second end 526' are coupled to the auger mounting disk 550 such that the auger 520 and the inner auger 520' do not rotate relative to the shaft 540. The inner auger 520' can extend from the inner auger second end 526' coupled to the auger mounting disk 550 beyond the portion of the screen 502 defining the plurality of openings 514 and into the pipe 530 to aid the flow of fluid through the screen 502 and pipe 530. The inner auger 520' also serves the purpose of dislodging any solid matter or thicker fluid that becomes lodged in one of the plurality of openings 514.

Figure 6:
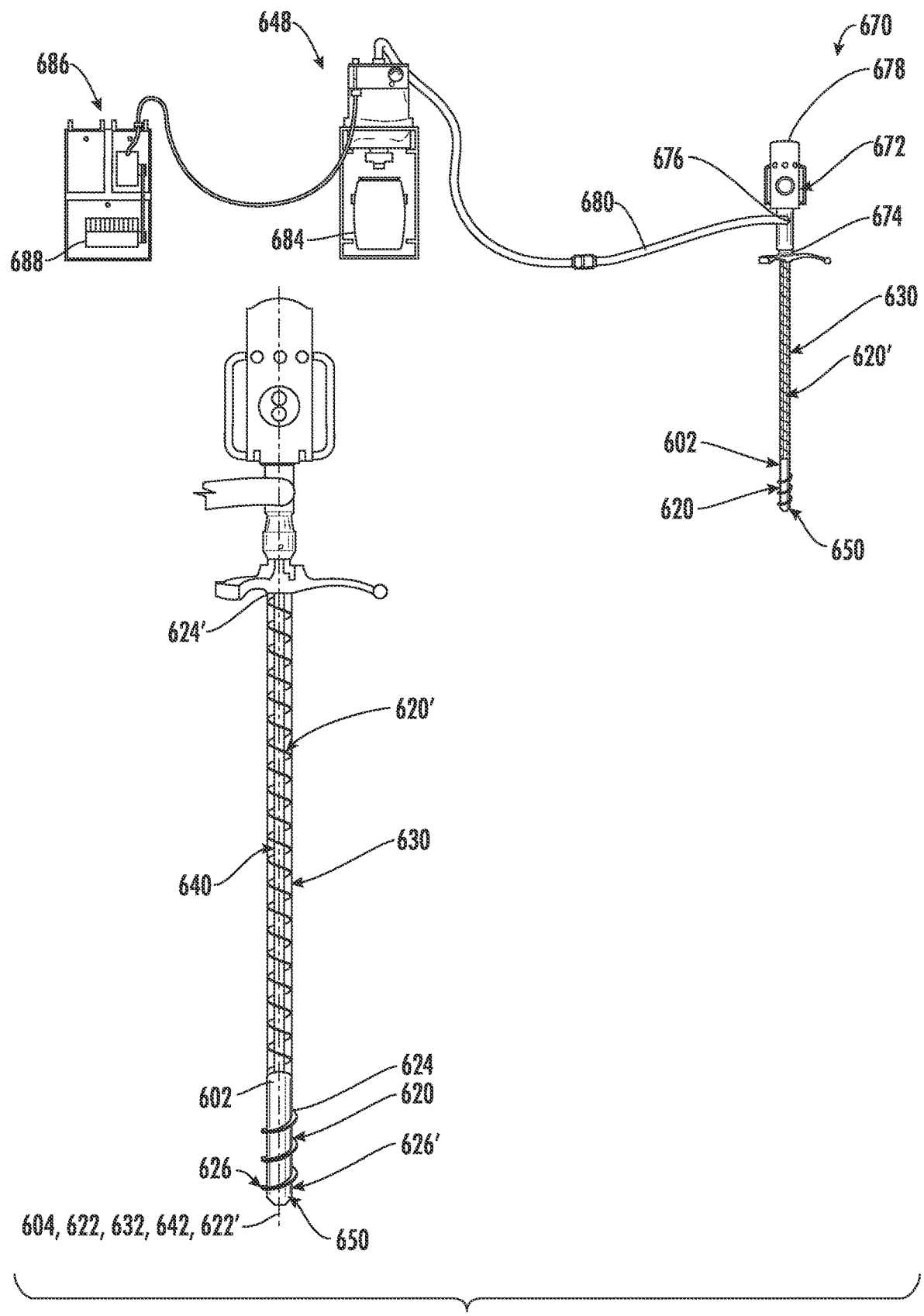
FIG. 6 is a side view of a suction system including a self-cleaning screen device, according to another implementation.

FIG. 6 shows a suction system 670 including a self-cleaning screen device 600 similar to the self-cleaning screen device 500 shown in FIG. 5, but the self-cleaning screen device 600 shown in FIG. 6 includes a second, inner auger 620' that extends the entire length of the pipe 630. Before suction is applied to the suction system 670, the inner auger 620' is rotated to initiate the flow of the fluid from the screen 602 to the vacuum pump 686. Because rotation of the inner auger 620' brings the fluid to the vacuum pump 686, the inner auger 620' eliminates the need to prime the vacuum pump 686 prior to use. The inner auger 620' is helically shaped and has an inner auger central axis 622', an inner auger first end 624', and an inner auger second end 626' opposite and axially spaced apart from the inner auger first end 624'. The inner auger 620' in this implementation also includes the shaft 640, and the inner auger 620' extends circumferentially around the shaft 640 as the inner auger 620' extends axially from the inner auger first end 624' to the inner auger second end 626'. The inner auger 620' extends from the inner auger second end 626' coupled to the auger mounting disk 650 through the pipe 630, to the inner auger first end 624' coupled to the motor 678 of the excluder 672. The inner auger 620' is disposed inside the screen 602 and pipe 630. The inner auger central axis 622', the auger central axis 622, the screen central axis 604, the pipe central axis 632, and the shaft central axis 642 are coincident with each other, and the inner auger 620' is rotatable about the inner auger central axis 622' relative to the screen 602 and pipe 630. Both the auger second end 626 and the inner auger second end 626' are coupled to the auger mounting disk 650.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A self-cleaning screen device comprising:
a screen, the screen being a hollow cylinder and having a screen central axis, a screen inner surface, a screen outer surface opposite and radially spaced apart from the screen inner surface, a screen first end, and a screen second end opposite and axially spaced apart from the screen first end, wherein the screen outer surface defines a plurality of openings extending radially to the screen inner surface;
an auger, the auger being helically shaped and having an auger central axis, an auger first end, and an auger second end opposite and axially spaced apart from the auger first end, wherein the auger is disposed around at least a portion of the screen outer surface such that the auger central axis and the screen central axis are coincident with each other and such that the auger second end is disposed adjacent the screen second end, the auger being rotatable about the auger central axis relative to the screen;
an auger mounting disk coupled to the auger second end; and
a shaft having a shaft central axis, a shaft first end, and a shaft second end opposite and spaced apart from the shaft first end, wherein the shaft extends through the screen from the screen first end such that the shaft second end is adjacent the screen second end, wherein the shaft central axis is axially aligned and coincident with the screen central axis, wherein a portion of the shaft is fixedly coupled to the auger mounting disk which is fixedly coupled to the auger second end such that the auger does not rotate relative to the shaft.

2. The self-cleaning screen device of claim 1, further comprising a pipe having a pipe central axis, a pipe inner surface, a pipe outer surface opposite and radially spaced apart from the pipe inner surface, a pipe first end, and a pipe second end opposite and axially spaced apart from the pipe first end, wherein the screen first end is coupled to the pipe second end such that the pipe central axis and the screen central axis are coincident with each other.

3. The self-cleaning screen device of claim 1, wherein either the auger extends helically in a clockwise direction from the auger second end to the auger first end and the auger rotates in a counterclockwise direction as viewed axially from the auger second end, or the auger extends helically in a counterclockwise direction from the auger second end to the auger first end and the auger rotates in a clockwise direction as viewed axially from the auger second end.

4. The self-cleaning screen device of claim 1, wherein a gap is defined between the auger and the screen outer surface, the gap being 1 mm to 10 mm.

5. The self-cleaning screen device of claim 1, further comprising a sweeping extension extending radially inwardly from the auger toward the auger central axis.

6. The self-cleaning screen device of claim 5, wherein the sweeping extension comprises a steel brush.

7. The self-cleaning screen device of claim 5, wherein the sweeping extension comprises a squeegee.

8. The self-cleaning screen device of claim 1, wherein the auger is capable of rotating about the auger central axis between 300 RPM to 600 RPM.

9. The self-cleaning screen device of claim 1, further comprising a motor coupled to the first end of the shaft capable of rotating the shaft.

10. A suction system comprising:
a pump having a suction inlet;
a pipe having a pipe central axis, a pipe inner surface, a pipe outer surface opposite and radially spaced apart from the pipe inner surface, a pipe first end, and a pipe second end opposite and axially spaced apart from the pipe first end;
a self-cleaning screen device comprising:
a screen, the screen being a hollow cylinder and having a screen central axis, a screen inner surface, a screen outer surface opposite and radially spaced apart from the screen inner surface, a screen first end, and a screen second end opposite and axially spaced apart from the screen first end, wherein the screen outer surface defines a plurality of openings extending radially to the screen inner surface;
an auger, the auger being helically shaped and having an auger central axis, an auger first end, and an auger second end opposite and axially spaced apart from the auger first end, wherein the auger is disposed around at least a portion of the screen outer surface such that the auger central axis and the screen central axis are coincident with each other and such that the auger second end is disposed adjacent the screen second end, the auger being rotatable about the auger central axis relative to the screen;
an auger mounting disk coupled to the auger second end; and
a shaft having a shaft central axis, a shaft first end, and a shaft second end opposite and spaced apart from the shaft first end,
wherein the shaft extends through the screen from the screen first end such that the shaft second end is adjacent the screen second end, wherein the shaft central axis is axially aligned and coincident with the screen central axis, wherein a portion of the shaft is fixedly coupled to the auger mounting disk which is fixedly coupled to the auger second end such that the auger does not rotate relative to the shaft, wherein the screen first end is coupled to the pipe second end such that the pipe central axis and the screen central axis are coincident with each other.

11. The suction system of claim 10, wherein either the auger extends helically in a clockwise direction from the auger second end to the auger first end and the auger rotates in a counterclockwise direction as viewed axially from the auger second end, or the auger extends helically in a counterclockwise direction from the auger second end to the auger first end and the auger rotates in a clockwise direction as viewed axially from the auger second end.

12. The suction system of claim 10, wherein a gap is defined between the auger and the screen outer surface, the gap being 1 mm to 10 mm.

13. The suction system of claim 10, further comprising a sweeping extension extending radially inwardly from the auger toward the auger central axis.

14. The suction system of claim 13, wherein the sweeping extension comprises a steel brush.

15. The suction system of claim 13, wherein the sweeping extension comprises a squeegee.

16. The suction system of claim 10, further comprising a motor coupled to the first end of the shaft capable of rotating the shaft.

* * * * *